(12) United States Patent
Lampe

(10) Patent No.: US 9,662,803 B2
(45) Date of Patent: May 30, 2017

(54) DRILL BIT

(75) Inventor: Rainer Lampe, Dinklage (DE)

(73) Assignee: HELLER TOOLS GMBH, Dinklage (DE)

(*) Notice: Subject to any disclaimer, the term of this patent is extended or adjusted under 35 U.S.C. 154(b) by 763 days.

(21) Appl. No.: 14/111,132

(22) PCT Filed: Apr. 10, 2012

(86) PCT No.: PCT/IB2012/051750
§ 371 (c)(1),
(2), (4) Date: Jan. 22, 2014

(87) PCT Pub. No.: WO2012/140570
PCT Pub. Date: Oct. 18, 2012

(65) Prior Publication Data
US 2014/0140782 A1 May 22, 2014

(30) Foreign Application Priority Data
Apr. 11, 2011 (DE) .................. 10 2011 016 686

(51) Int. Cl.
*E21B 10/44* (2006.01)
*B28D 1/14* (2006.01)
(Continued)

(52) U.S. Cl.
CPC .............. *B28D 1/146* (2013.01); *B23B 51/02* (2013.01); *B23C 3/32* (2013.01); *B24B 1/00* (2013.01);
(Continued)

(58) Field of Classification Search
CPC ...................................................... E21B 10/44
See application file for complete search history.

(56) References Cited

U.S. PATENT DOCUMENTS

| 837,490 A | 12/1906 | Nelson |
| 4,967,855 A | 11/1990 | Moser |
| (Continued) | | |

FOREIGN PATENT DOCUMENTS

| DE | 2358447 B1 | 3/1975 |
| DE | 19753731 A1 | 6/1999 |
| (Continued) | | |

OTHER PUBLICATIONS

International Search Report and Written Opinion corresponding to PCT/IB2012/051750, dated Aug. 7, 2012.

*Primary Examiner* — David Andrews
(74) *Attorney, Agent, or Firm* — Hauptman Ham LLP

(57) ABSTRACT

The invention relates to a rock drill comprising an insertion portion, a flute adjoined to the insertion portion, and a head portion adjoined to the flute, wherein the flute is of at least double-spiral configuration and correspondingly has at least two substantially spiral discharge grooves, to which respectively two substantially spiral flute webs forming the lateral groove walls are assigned. It is proposed that a constant spiral pitch is assigned to the first discharge groove, inclusive of the lateral groove walls thereof, along the drill longitudinal axis, and that at least one of the two flute webs assigned to the first discharge groove has or have along the drill longitudinal axis, at least in sections, a web spine width which changes, in particular, alternately.

13 Claims, 3 Drawing Sheets

(51) Int. Cl.
*B23B 51/02* (2006.01)
*B23C 3/32* (2006.01)
*B24B 1/00* (2006.01)
*B24B 19/04* (2006.01)

(52) U.S. Cl.
CPC .......... *B24B 19/04* (2013.01); *E21B 10/445* (2013.01); *B23B 2226/75* (2013.01); *B23B 2251/043* (2013.01); *B23B 2251/408* (2013.01); *B23B 2251/446* (2013.01); *Y10T 408/9097* (2015.01); *Y10T 409/303808* (2015.01)

(56) References Cited

U.S. PATENT DOCUMENTS

| | | |
|---|---|---|
| 6,250,857 B1 | 6/2001 | Kersten |
| 6,427,789 B1 | 8/2002 | Fuss et al. |
| 2002/0040813 A1 | 4/2002 | Kleine et al. |
| 2003/0019667 A1 | 1/2003 | Peetz |
| 2004/0052597 A1* | 3/2004 | Defougeres ............ B23B 51/02 408/230 |

FOREIGN PATENT DOCUMENTS

| | | |
|---|---|---|
| DE | 20108179 U1 | 7/2001 |
| DE | 10050229 C1 | 2/2002 |
| DE | 10243403 A1 | 4/2004 |
| DE | 102009023299 A1 | 12/2010 |
| EP | 1396303 A2 | 3/2004 |

* cited by examiner

DRILL BIT

RELATED APPLICATIONS

The present application is a National Phase of International Application Number PCT/IB2012/051750, filed, Apr. 10, 2012, and claims priority from, German Application Number 102011016686.6, filed Apr. 11, 2012.

The invention relates to a rock drill, in particular for use in connection with a hammer drilling device, having the features of the preamble to claim 1, and to a method for producing a rock drill, having the features of the preamble to claim 11.

The rock drill in question is suitable for drilling in concrete or reinforced concrete, but also in other masonry, rock or the like. The rock drill in question is usually equipped with an insertion portion, a flute adjoined to the insertion portion and a head portion adjoined to the flute.

Particular importance is in the present case attached to the flute, which serves to evacuate the removed cuttings from the head portion in the direction of the insertion portion. The flute is usually of spiral configuration, so that appropriate conveying edges and conveying surfaces for the cuttings are obtained.

The conveyance of cuttings when drilling in concrete or the like places quite particular demands on the flute, since the consistency here ranges from powdery to lumpy. In the light of this, measures must be taken to ensure the frictionless evacuation of cuttings and, in particular, avoid blockage of the flute.

At the same time, care must be taken to ensure that the formation of natural vibrations of the drilling system is as far as possible suppressed overall.

The known rock drill (DE 201 08 179 U1) from which the invention derives shows a flute whose geometry changes along the drill longitudinal axis. More specifically, for the improvement of the cuttings transport, it is provided that the pitches of discharge grooves and flute webs change along the drill longitudinal axis.

Due to the symmetrical geometry of its flute along the drill axis, the known rock drill is advantageous with regard to the suppression of natural vibrations. Potential exists to optimize the cuttings transport.

The invention is based on the problem of designing and refining the known rock drill in such a way that the cuttings transport is optimized, at the same time as natural vibrations are effectively suppressed.

The above problem is solved in a rock drill according to the preamble to claim 1 by virtue of the features of the characterizing part of claim 1.

Of fundamental importance is the basic notion of constructing the flute from a symmetrical geometry and a non-symmetrical geometry in such a way that, on the one hand, natural vibrations are suppressed and, on the other hand, cuttings transport is optimized.

More specifically, it is firstly proposed that a constant spiral pitch is assigned to a first discharge groove, inclusive of the lateral groove walls thereof, along the drill longitudinal axis. It is thereby ensured that a discharge groove is in any event configured symmetrically along the drill longitudinal axis. In trials, that has proved to be optimal with regard to the cuttings transport.

It is additionally proposed that the two flute webs assigned to the first discharge groove have along the drill longitudinal axis, at least in sections, a web spine width which changes, in particular alternately. That means that the second discharge groove adjacent to the first discharge groove is specifically not configured symmetrically along the drill longitudinal axis. This leads to an effective suppression of the abovementioned natural vibrations.

All in all, the proposed rock drill has demonstrated optimal results with regard to the cuttings transport, on the one hand, and the natural vibration characteristics, on the other hand.

In the particularly preferred embodiment as claimed in claim 5, the second discharge groove has a spiral pitch which lies in one flute portion substantially above and in another flute portion substantially below the spiral pitch of the first discharge groove. An abovementioned, alternately changing web spine width is thus able to be produced in a particularly simple manner.

According to a further teaching as claimed in claim 11, to which independent importance is likewise attached, a method for producing a rock drill of the generic type is claimed, wherein at least one discharge groove of the rock drill has different spiral pitches in different axial flute portions.

The proposed method is aimed at the introduction of discharge grooves into a substantially cylindrical drill blank. For this purpose, a standard grinding or milling cutter disk having a peripheral face and two side faces is provided, wherein the grinding or milling cutter is set at a setting angle in relation to the longitudinal axis of the rock drill. For the introduction of the at least one discharge groove, the grinding or milling cutter disk is displaced with a longitudinal feed in the direction of the drill longitudinal axis and the drill blank is rotated with an angular feed about the drill longitudinal axis.

Now it is of fundamental importance that, for the introduction of the at least one discharge groove, the setting angle of the grinding or milling cutter disk is kept constant and the ratio of longitudinal feed to angular feed is varied, in particular alternately, for the adjustment of the different spiral pitches.

According to the proposal, it has been recognized that the spiral pitch of the discharge groove, which changes along the drill longitudinal axis, can be easily realized by varying the ratio of longitudinal feed to angular feed, while the setting angle of the grinding or milling cutter disk remains constant.

The embodiment as claimed in claim 12 relates to a method for producing a rock drill according to the first-named teaching, wherein, for the introduction of the first discharge groove, the ratio of longitudinal feed to angular feed is kept constant and, for the introduction of the second discharge groove, the ratio of longitudinal feed to angular feed, as illustrated above, is varied, in particular alternately.

Although the proposed method leads to increased lateral load upon the grinding or milling cutter disk, since in this method the grinding or milling cutter disk regularly "slips" via one of its side faces, the advantage of short set-up times through elimination of the change of adjustment angle of the grinding or milling cutter disk far outweighs this aspect.

The invention is explained in greater detail below with reference to a drawing representing merely illustrative embodiments, in which drawing.

Figure 1:
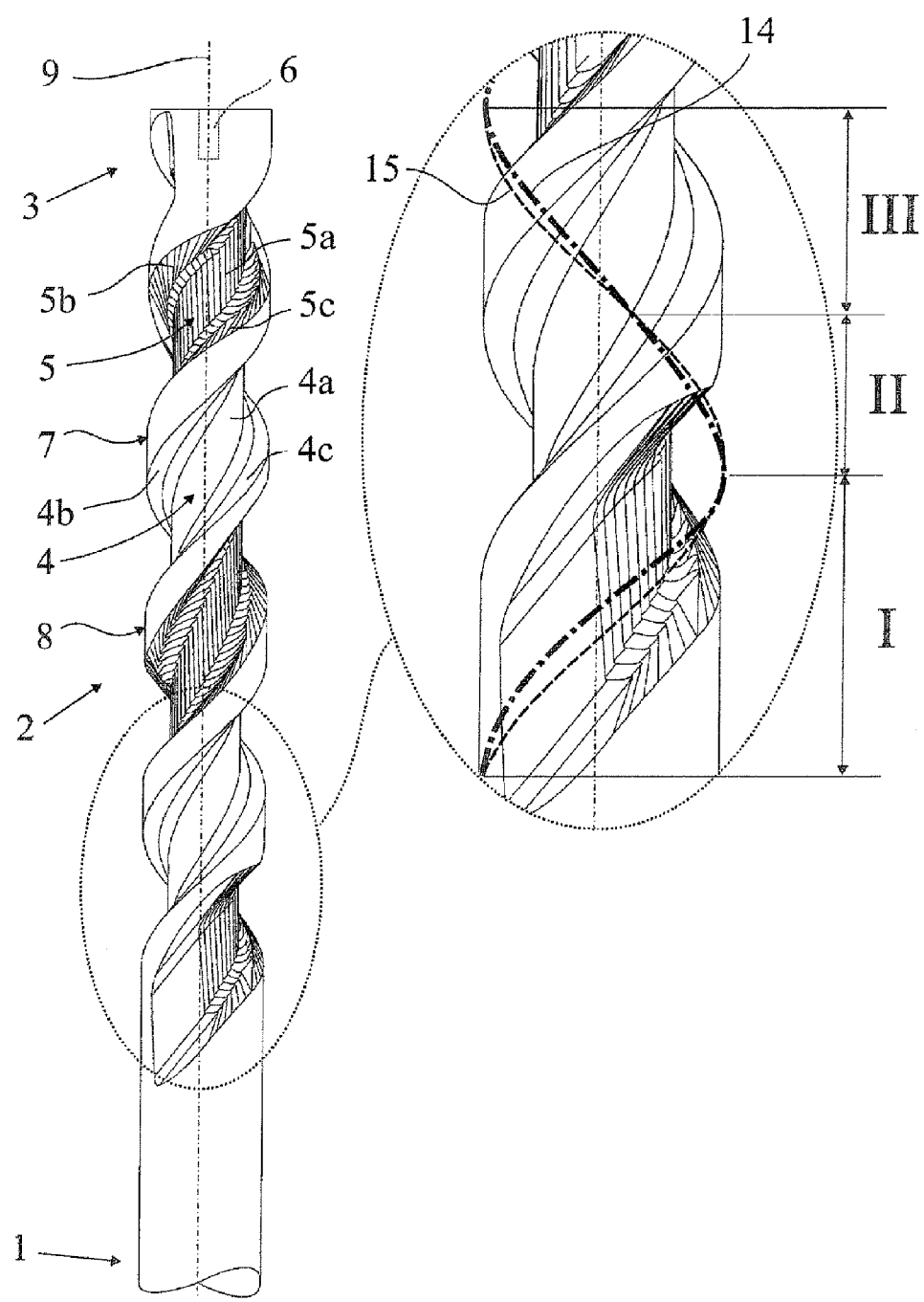
FIG. 1 shows a proposed rock drill as a semifinished part in side view.

The proposed rock drill is represented in the drawing as a semifinished part. It has an insertion portion 1, which is usually provided with a coupling configuration (not represented). Adjoined to the insertion portion 1 is a flute 2, which is here and preferably of double-spiral configuration. The flute 2 is in turn adjoined by a head portion 3, which, in the product-ready state, is equipped with a cutting edge arrangement. The cutting edge arrangement is here preferably inserted in a slot 6 in the head portion 3. In the case of the represented semifinished part, the slot 6 is merely indicated and the cutting edge arrangement is not shown.

The represented rock drill is designed for a two-lipped cutter, which has two cutting edges extending in opposite directions. On both sides of such a cutting edge arrangement, designed preferably as an insert element, extend the discharge grooves 4, 5, which together form the flute 2.

In the represented illustrative embodiment, two spiral discharge grooves 4, 5 are provided. It is also conceivable, however, for more than two discharge grooves 4, 5 to be provided, for instance if the cutting edge arrangement is in the form of a three-lipped cutter or a four-lipped cutter.

The discharge grooves 4, 5 can have quite different cross-sectional forms. It is in any event the case that respectively one groove floor 4a, 5a and respectively two groove walls 4b, 5b and 4c, 5c are provided.

From the representation in FIG. 1, it can be seen that the lateral groove walls 4b, 4c, 5b, 5c are formed by substantially spiral flute webs 7, 8.

With a view to a clear representation, the first discharge groove 4 is represented in the drawing without polygonal surface marking, and the second discharge groove 5 with polygonal surface marking.

Now it is of fundamental importance that a constant spiral pitch is assigned to the first discharge groove 4, inclusive of its lateral groove walls 4b, 4c, along the drill longitudinal axis 9. In this respect, this first discharge groove 4 provides a symmetrical component part of the proposed rock drill.

It is also of fundamental importance that at least one of the two flute webs 7, 8 assigned to the first discharge groove 4 has or have along the drill longitudinal axis 9, at least in sections, a changing web spine width. Here and preferably, both flute webs 7, 8 are equipped with changing web spine widths. In this context, it can in principle be provided that the web spine widths, at least in sections, are constant. As a result, an asymmetrical component of the proposed rock drill is obtained.

A further increase in the symmetry of the rock drill can preferably be achieved by virtue of the fact that the first discharge groove 4, related to the cross section perpendicular to the drill longitudinal axis 9, has an identical cross sectional contour substantially over the entire flute 2.

In a particularly preferred embodiment, it is the case that the entire flute 2, viewed in cross section perpendicular to the drill longitudinal axis 9, in any event with respect to the configuration of the flute webs 7, 8, is asymmetrically configured at least in one axial flute portion, in this case over the entire flute 2. Given a suitable design, the asymmetrical cross section can have an extremely vibration-reducing effect.

In the illustrative embodiment represented in FIG. 1, it is the case that the web spine widths of both flute webs 7, 8 change over the entire drill longitudinal axis 9. In principle, it can also however be advantageous for at least one of the two flute webs 7, 8 assigned to the first discharge groove 4 to have web spine widths which are constant, at least in sections, along the drill longitudinal axis 9.

An alternately changing web spine width can be realized in a simple manner by at least a second discharge groove 5 having a spiral pitch which lies in one axial flute portion substantially above, and in another axial flute portion substantially below the spiral pitch of the first discharge groove 4. For this effect of changing web spine widths, the adjacent arrangement of the second discharge groove 5 relative to the first discharge groove 4 is necessary.

The spiral pitch of the second discharge groove 5 can be seen in first approximation from the representation in FIG. 1, there on the basis of the web spine widths of the flute webs 7, 8. In regions in which the web spine width of the respective flute web 7, 8 decreases in the direction of the head portion 3, the spiral pitch of the second discharge groove 5 is in first approximation greater than the spiral pitch of the first discharge groove 4. If, on the other hand, the corresponding web spine width increases in the direction of the head portion 3, then the spiral pitch of the second discharge groove 5 lies in first approximation below the spiral pitch of the first discharge groove 4. Insofar as the web spine width of a flute web 7, 8 remains constant in the direction of the head portion, the spiral pitches of the first discharge groove 4 and of the second discharge groove 5 are in first approximation identical.

An interesting variant consists in the second discharge groove 5 having, at least in sections, a substantially constant spiral pitch. The symmetry of the second discharge groove 5 can thus be enhanced, which can be advantageous, in particular, with respect to the cuttings transport.

Alternatively or additionally, it can be provided that the second discharge groove 5, at least in sections, has a changing spiral pitch. Above all, the combination of an, in sections, substantially constant spiral pitch with an, in sections, changing spiral pitch of the second discharge groove 5 has led in trials to quite especially good results.

Also of interest is an embodiment in which the second discharge groove 5 shows between two flute portions an uneven spiral pitch pattern. Additional conveying edges can thereby be produced, which, once again, can be advantageous with regard to the cuttings transport. With a view to a visually appealing configuration, it can also however be provided that the second discharge groove 5 shows between two flute portions of different spiral pitch a substantially even spiral pitch pattern.

In the present case, particular importance is attached to the method of producing the proposed rock drill. In principle, different production methods such as grinding, milling or rolling are applicable here. According to a further teaching, to which independent importance is attached, a specific grinding or milling method is claimed.

The method relates quite generally to the production of a rock drill comprising an insertion portion 1, a flute 2 adjoined to the insertion portion 1, and a head portion 3 adjoined to the flute 2, wherein the flute 2 has at least one spiral discharge groove 4, 5, at least one discharge groove 5 having in different axial flute portions different spiral pitches. One example of this at least one discharge groove is the abovementioned second discharge groove 5.

For the implementation of the method, a grinding or milling cutter disk 10 having a peripheral face 11 and two side faces 12, 13 is provided, wherein the grinding or milling cutter disk 10 is set in a known manner at a setting angle $\phi$ in relation to the drill longitudinal axis. For the introduction of the at least one discharge groove 4, 5, the grinding or milling cutter disk 10 is displaced with a longitudinal feed $v_x$ in the direction of the drill longitudinal axis 9, and the drill blank is rotated with an angular feed $\omega$ about the drill longitudinal axis 9. In this respect, the production method still corresponds to the method known from the prior art.

Now it is of fundamental importance that, for the introduction of the second discharge groove 5, the setting angle φ of the grinding or milling cutter disk 10 is kept constant and the feed ratio R of longitudinal feed $v_x$ to angular feed ω is varied, in particular alternately, for the adjustment of the different spiral pitches.

It has been recognized that a spiral pitch which is variable along the drill longitudinal axis 9 can be easily realized by the feed ratio R of longitudinal feed $v_x$ to angular feed ω being varied, in particular alternately, for the adjustment of the different spiral pitches.

More specifically, for the production of the drill represented in FIG. 1, it is preferably provided that, for the introduction of all discharge grooves 4, 5, the setting angle φ of the grinding or milling cutter disk 10 is kept constant, and that, for the introduction of the first discharge groove 4, the feed ratio R is kept constant and, for the introduction of the second discharge groove 5, the feed ratio R is varied, in particular alternately, for the adjustment of the different spiral pitches. It is thus possible, with one and the same setting angle φ of the grinding or milling cutter disk 10, to produce both the first discharge groove 4 with constant spiral pitch and the second discharge groove 5 with changing spiral pitch.

Insofar as the feed ratio R is set such that the material removal is effected substantially via the peripheral face 11, and not via the side faces 12, 13 of the grinding or milling cutter disk 10, the grinding or milling cutter disk 10 works in synchronous operation. In a particularly preferred embodiment, it is the case that, for the introduction of at least one discharge groove 4, in particular of the first discharge groove 4, the constant synchronous feed ratio $R_0$ is adjusted.

In a particularly preferred embodiment, it is provided that, for the introduction of at least one discharge groove 5, here the second discharge groove 5, the feed ratio R is varied, in particular alternately, for the adjustment of different spiral pitches, such that the feed ratio R lies, in some sections, above the synchronous feed ratio $R_0$ and, in some sections, below the synchronous feed ratio $R_0$.

Insofar as an above, at least in sections constant spiral pitch pattern is desired, it is preferably provided that the feed ratio R, for the introduction of at least one discharge groove 4, 5, is at least in sections constant.

Figure 2:
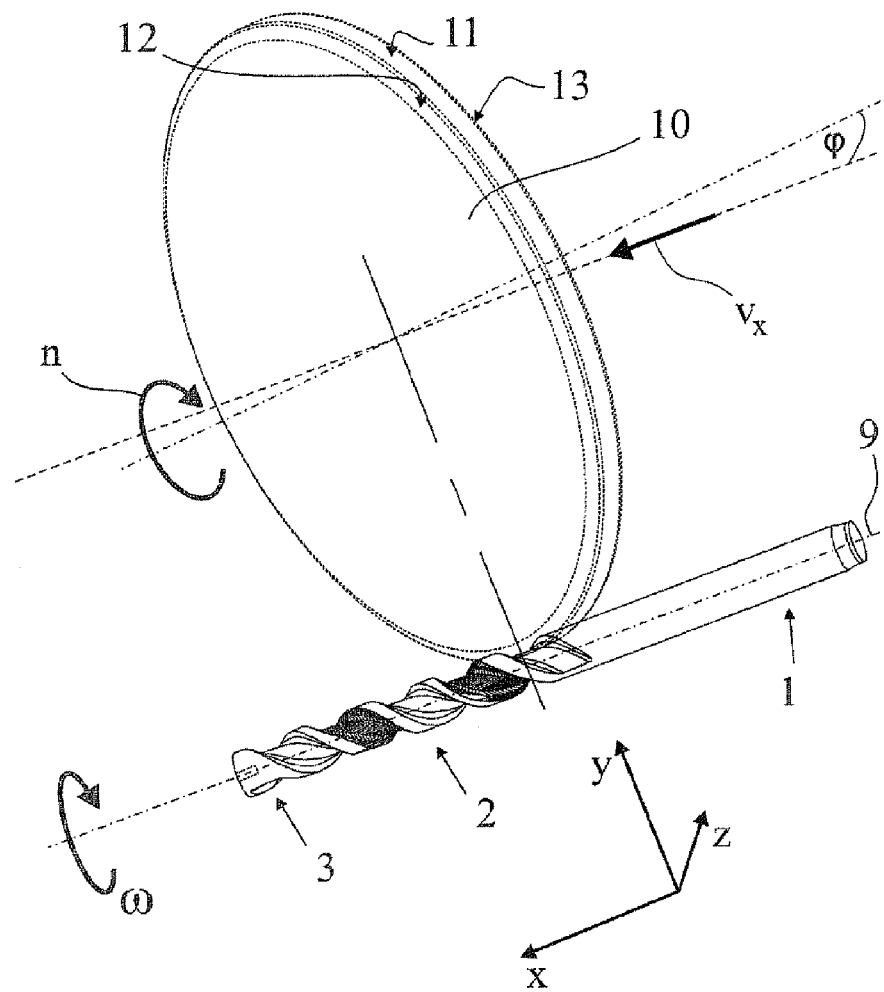
FIG. 2 shows the rock drill according to FIG. 1 during the introduction of the first discharge groove.
Figure 2:
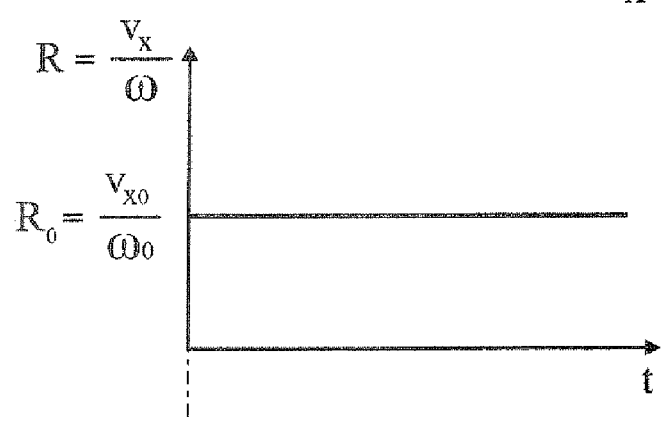

FIG. 2 shows in quite schematic representation the position of the grinding or milling cutter disk 10 relative to the drill blank, wherein, with a view to a clear representation, the ready-ground or ready-milled flute 2 is represented, even though this, at the represented production point, is not yet fully ground or milled.

From the feed ratio-time graph in FIG. 2, it becomes clear that, when the first discharge groove 4 is introduced, the feed ratio R is constant throughout the production time. The feed ratio R is here constituted by the abovementioned synchronous feed ratio $R_0$. The grinding or milling cutter disk 10 is here operated at the rotation speed n.

Figure 3:
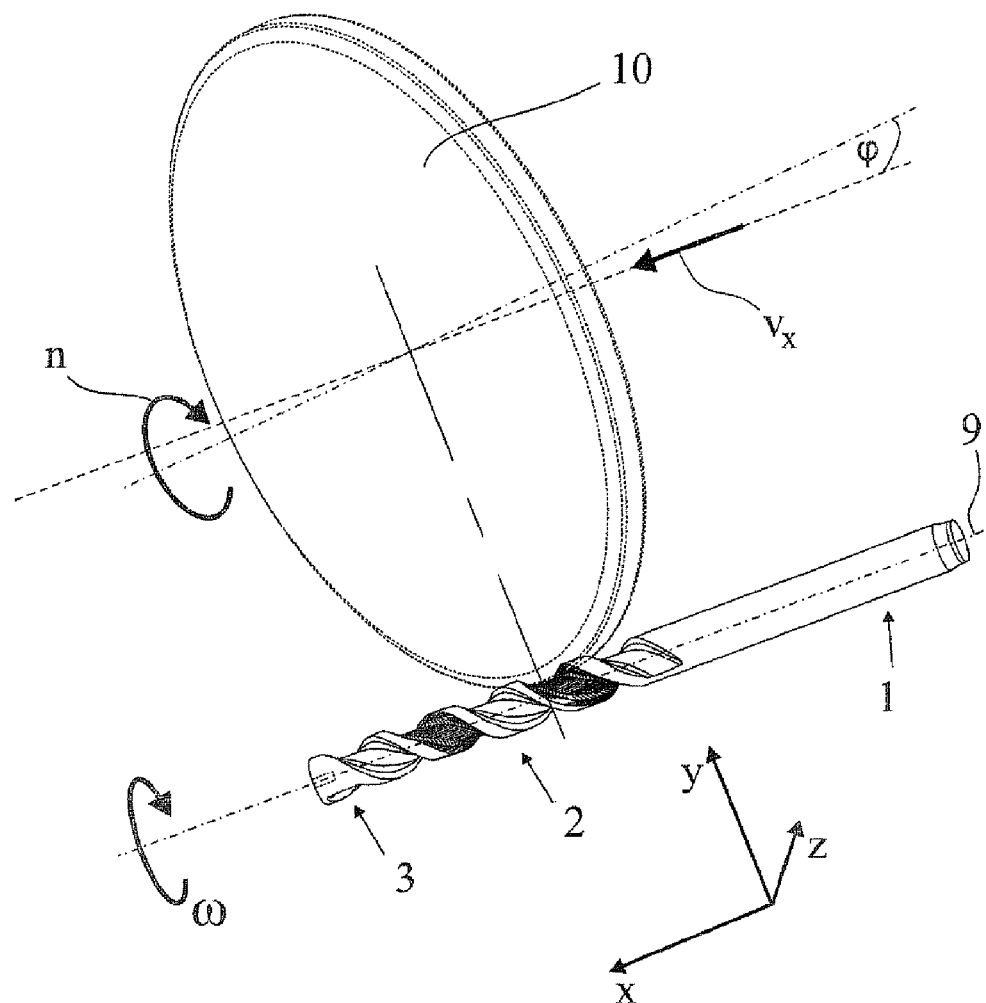
FIG. 3 shows the rock drill according to FIG. 1 during the introduction of the second discharge groove.
Figure 3:
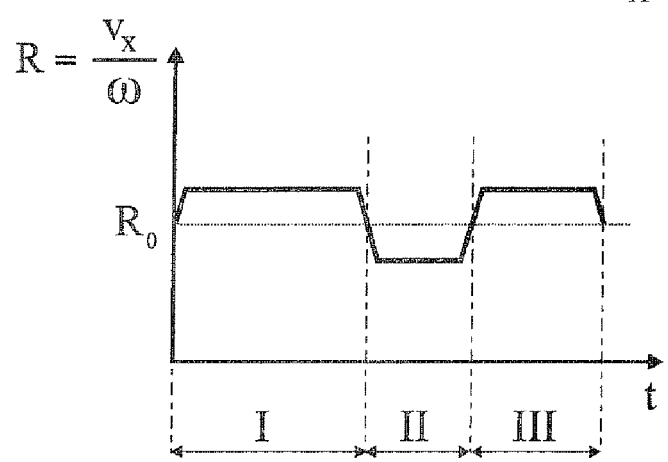

It looks different in that introduction of the second discharge groove 5 which is represented in FIG. 3. From the feed ratio-time graph in FIG. 3, it can be seen that the feed ratio R changes over the production time, namely in a first segment I lies above the synchronous feed ratio $R_0$, in a second segment II lies below the synchronous feed ratio $R_0$, and in a third segment III again lies above the synchronous feed ratio $R_0$. The time segments I, II, III represented in FIG. 3 correspond to the axial portions I, II, III represented in FIG. 1.

The detailed view in FIG. 1 shows in a dash-dot line the real trajectory 14 of the tool reference point of the grinding or milling cutter disk 10 during the grinding or milling of the second discharge groove 5. The tool reference point of the grinding or milling cutter disk 10 is constituted by a point which has a fixed relative position to the mounting of the grinding or milling cutter disk 10.

By means of the tool reference point, the trajectory of the grinding or milling cutter disk 10 relative to the workpiece can be defined in the usual manner.

By comparison, an imaginary trajectory 15 of the tool reference point of the grinding or milling cutter disk 10 during the grinding or milling of an imaginary discharge groove 5 having a spiral pitch which is identical to the spiral pitch of the first discharge groove 4 is shown in FIG. 1 in a dashed line. This imaginary trajectory 15 is hereinafter referred to as the reference trajectory 15.

The fact that the real trajectory 14 of the tool reference point intersects the reference trajectory 15 several times, namely respectively at the transition from one portion to the next portion of portions I, II, III, is of interest here.

It can be clearly seen from the detailed representation in FIG. 1 that the spiral pitch of the trajectory 14 of the tool reference point moves around the spiral pitch of the reference trajectory 15. Related to the spiral pitch of the reference trajectory 15, the spiral pitch of the trajectory 14 lies in a range between about 70% and 140%, in particular between 75% and 135%.

The invention claimed is:

1. A rock drill comprising an insertion portion, a flute adjoined to the insertion portion, and a head portion adjoined to the flute, wherein the flute is of at least double-spiral configuration and correspondingly has at least two substantially spiral discharge grooves, to which respectively two substantially spiral flute webs forming lateral groove walls are assigned,
    wherein a constant spiral pitch is assigned to the first discharge groove, inclusive of the lateral groove walls thereof, along the drill longitudinal axis, and in that at least one of the two flute webs assigned to the first discharge groove has or have along the drill longitudinal axis, at least in sections, a web spine width which changes alternately.

2. The rock drill as claimed in claim 1, wherein at least one of the two flute webs assigned to the first discharge groove has or have along the drill longitudinal axis, at least in sections, a constant web spine width.

3. The rock drill as claimed in claim 1, wherein at least a second discharge groove has a spiral pitch which lies in one axial flute portion substantially above, and in another axial flute portion substantially below the spiral pitch of the first discharge groove.

4. The rock drill as claimed in claim 3, wherein the second discharge groove has a spiral pitch which from one axial flute portion to the next axial flute portion lies alternately substantially above or substantially below the spiral pitch of the first discharge groove.

5. The rock drill as claimed in claim 1, wherein the second discharge groove has, at least in sections, a substantially constant spiral pitch.

6. The rock drill as claimed in claim 1, wherein the second discharge groove has, at least in sections, a changing spiral pitch.

7. The rock drill as claimed in claim 1, wherein the second discharge groove shows between two portions of different spiral pitch an uneven spiral pitch pattern.

8. The rock drill as claimed in claim 1, wherein the second discharge groove shows between two portions of different spiral pitch a substantially even spiral pitch pattern.

9. A method for producing a rock drill, as claimed in claim 1, comprising an insertion portion, a flute adjoined to the insertion portion, and a head portion adjoined to the flute, wherein the flute has at least one spiral discharge groove, wherein at least one discharge groove of the at least one spiral discharge grooves has different spiral pitches, wherein a grinding or milling cutter disk having a peripheral face and two side faces are provided, wherein the grinding or milling cutter disk is set at a setting angle in relation to the drill longitudinal axis, wherein, for the introduction of the at least one discharge groove, the grinding or milling cutter disk is displaced with a longitudinal feed in the direction of the drill longitudinal axis and the drill blank is rotated with an angular feed about the drill longitudinal axis, wherein, for the introduction of the at least one discharge groove with different spiral pitches, the setting angle of the grinding or milling cutter disk is kept constant and the feed ratio of longitudinal feed to angular feed is varied alternately for the adjustment of the different spiral pitches.

10. The method as claimed in claim 9, wherein, for the introduction of all discharge grooves, the setting angle of the grinding or milling cutter disk is kept constant, and in that, for the introduction of a first discharge groove, the feed ratio is kept constant and, for the introduction of a second discharge groove, the feed ratio is varied alternately for the adjustment of the different spiral pitches.

11. The method as claimed in claim 9, wherein, given a certain synchronous feed ratio, the material removal is effected substantially via the peripheral face, and not via the side faces of the grinding or milling cutter disk, and in that, for the introduction of at least one discharge groove, the constant synchronous feed ratio is adjusted.

12. The method as claimed in claim 10, wherein, for the introduction of at least one discharge groove, the feed ratio is varied alternately for the adjustment of different spiral pitches, such that the feed ratio lies, in some sections, above a synchronous feed ratio and, in some sections, below the synchronous feed ratio.

13. The method as claimed in claim 9, wherein, for the introduction of at least one discharge groove, the feed ratio, at least in sections, is constant.

* * * * *